Nov. 13, 1956 A. ELLETT 2,770,671

SUBSCRIPTION TELEVISION SYSTEM

Filed Feb. 2, 1951 5 Sheets-Sheet 1

INVENTOR.
ALEXANDER ELLETT
BY Francis W. Crotty
HIS ATTORNEY

Nov. 13, 1956 A. ELLETT 2,770,671

SUBSCRIPTION TELEVISION SYSTEM

Filed Feb. 2, 1951 5 Sheets-Sheet 2

INVENTOR.
ALEXANDER ELLETT
BY Francis W. Crotty
HIS ATTORNEY

INVENTOR.
ALEXANDER ELLETT
BY Francis W. Crotty
HIS ATTORNEY

Nov. 13, 1956 A. ELLETT 2,770,671

SUBSCRIPTION TELEVISION SYSTEM

Filed Feb. 2, 1951 5 Sheets-Sheet 4

INVENTOR.
ALEXANDER ELLETT
BY Francis W. Crotty
HIS ATTORNEY

INVENTOR.
ALEXANDER ELLETT
BY Francis W. Crotty
HIS ATTORNEY

United States Patent Office 2,770,671

Patented Nov. 13, 1956

2,770,671

SUBSCRIPTION TELEVISION SYSTEM

Alexander Ellett, River Forest, Ill., assignor to Zenith Radio Corporation, a corporation of Illinois Application February 2, 1951, Serial No. 209,185

20 Claims. (Cl. 178—5.1)

Figure 1:
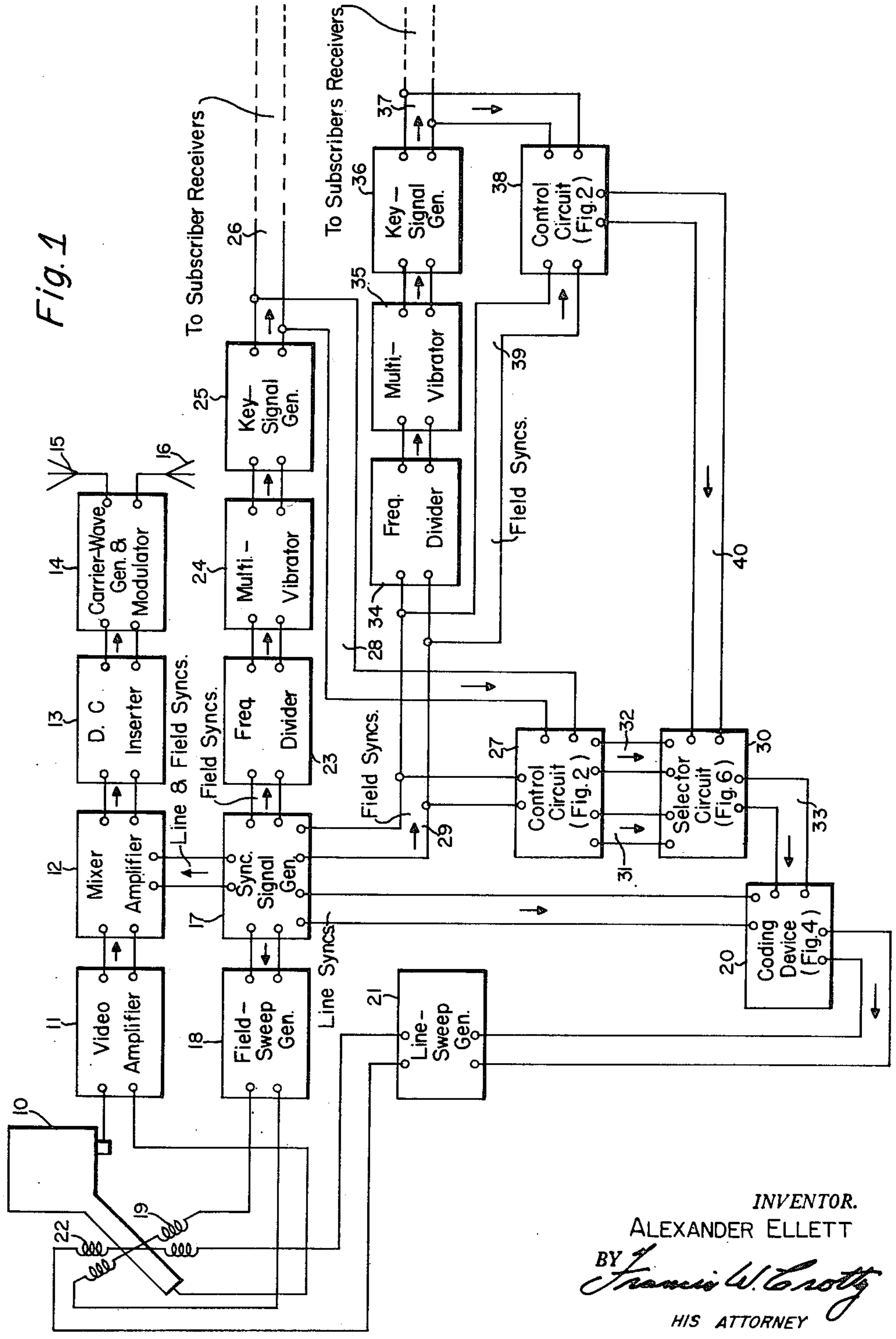

This invention relates to television signalling systems of the subscription type in which a television signal is transmitted in coded or scrambled form.

Subscription television systems are disclosed in copending application Serial No. 773,848, Roschke, filed September 13, 1947, entitled "Image Transmission System," now issued as Patent 2,547,598, and in Patent No. 2,510,046, issued May 30, 1950, Ellett et al., entitled "Radio-Wire Signalling System," both assigned to the present assignee. The present invention pertains to a subscription television system of the same general type but one in which the television signal is coded with an exceedingly high degree of complexity to render it most difficult, if not impossible, for unauthorized receivers to decode and utilize the television signal.

In accordance with the present invention, coding of a television signal is effected by varying the character of the transmission from time to time between a plurality, preferably, of three or more of discretely different modes. For example, in one mode the timing of the video components of the radiated signal may have a preselected value relative to the synchronizing components; in another mode the timing between the video and synchronizing components may be advanced a given amount relative to the preselected value; while in the third mode this timing may be retarded by the same amount with respect to the preselected value. A first key signal is supplied to subscriber receivers and some characteristic thereof, such as the amplitude or frequency, is varied to indicate to the receiver the spaced operating intervals in which the mode of transmission is modified. A second key signal is also supplied to subscriber receivers with variations in some similar characteristic which denote the particular mode to which the transmission is changed. Decoding apparatus in the receiver, actuated during time intervals denoted by the first key signal and in a sense indicated by the second key signal, control the operating characteristics of the receiver to permit faithful image reproduction of the broadcast which is unintelligible to conventional receivers because their successful operation is predicated on the reception of a signal having an invariable composition.

Considered more generally, the mode of transmission is changed from time to time as indicated by the first key signal, but there is an ambiguity which has to be resolved because the change may be to any one of a group of different modes. This ambiguity is resolved by the second key signal which advises the receiver of the particular one of the possible modes that is selected. Of course, the illustrative example given above is attractive because it merely requires time delay or advancing components in the receiver to accomplish decoding. Nevertheless, the invention also contemplates the use of more complex coding and decoding mechanisms to enhance the secrecy aspects. More particularly, in some operating modes the phase of the video components may be inverted, the direction of field or line scanning may be reversed, or any of a variety of other alterations may be made to the transmission, the latitude being limited only by the capabilities of the transmitting and receiving equipment.

In order to preserve the subscription broadcast for the exclusive use of subscribing receivers; it is preferred to transmit at least part of the necessary decoding information, that is the key signals, on a private link to the receivers. It is convenient to make use of a line circuit such as a telephone or power line. Where only a portion of the key signals is disseminated by way of a private link the remainder may be radiated independently of, or in conjunction with, the video information.

It is helpful in considering this type of subscription system to regard the first key signal as representing the time schedule in accordance with which the mode of transmission is varied. The second key signal may likewise be regarded as a schedule representing the sense in which the mode of transmission is changed. Either or both schedules may be repetitive or random in nature although the highest degree of secrecy is attained with random coding.

It is, accordingly, an object of this invention to provide an improved subscription television system in which a television signal is coded with a high degree of complexity to render unauthorized reception thereof extremely difficult if not impossible.

A further object of this invention is to provide an improved subscription television system in which coding of the television signal is accomplished by varying the character of the transmission between a plurality of modes, and in which at least two key signals are required for decoding the television signal.

A specific object of this invention is to provide an improved subscription television system in which key signals supplied to subscribing receivers designate not only the time sequence of the coding schedule but also the sense in which the transmission is varied in that time sequence.

Figure 2:
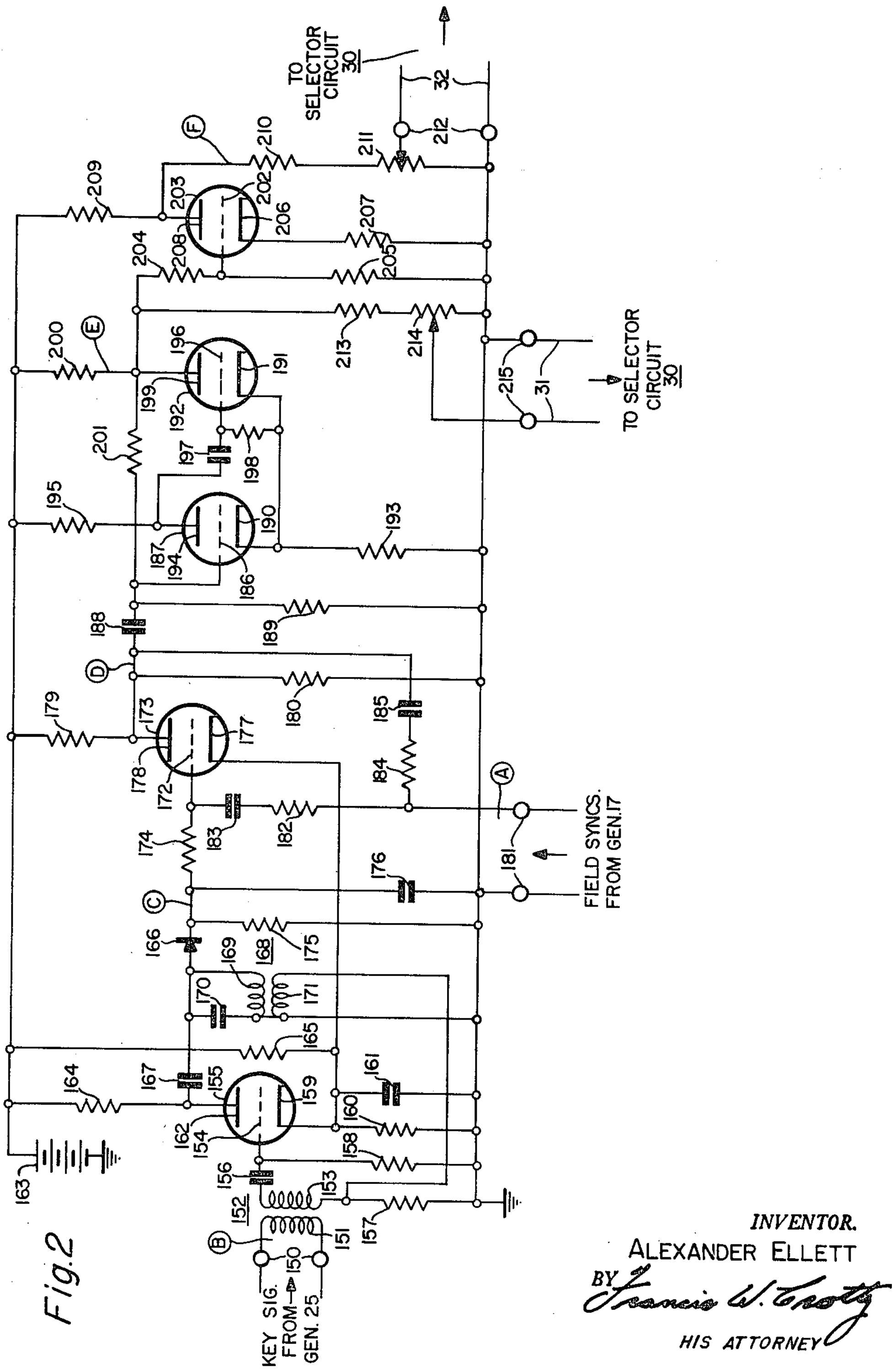
Figures 3, 5:
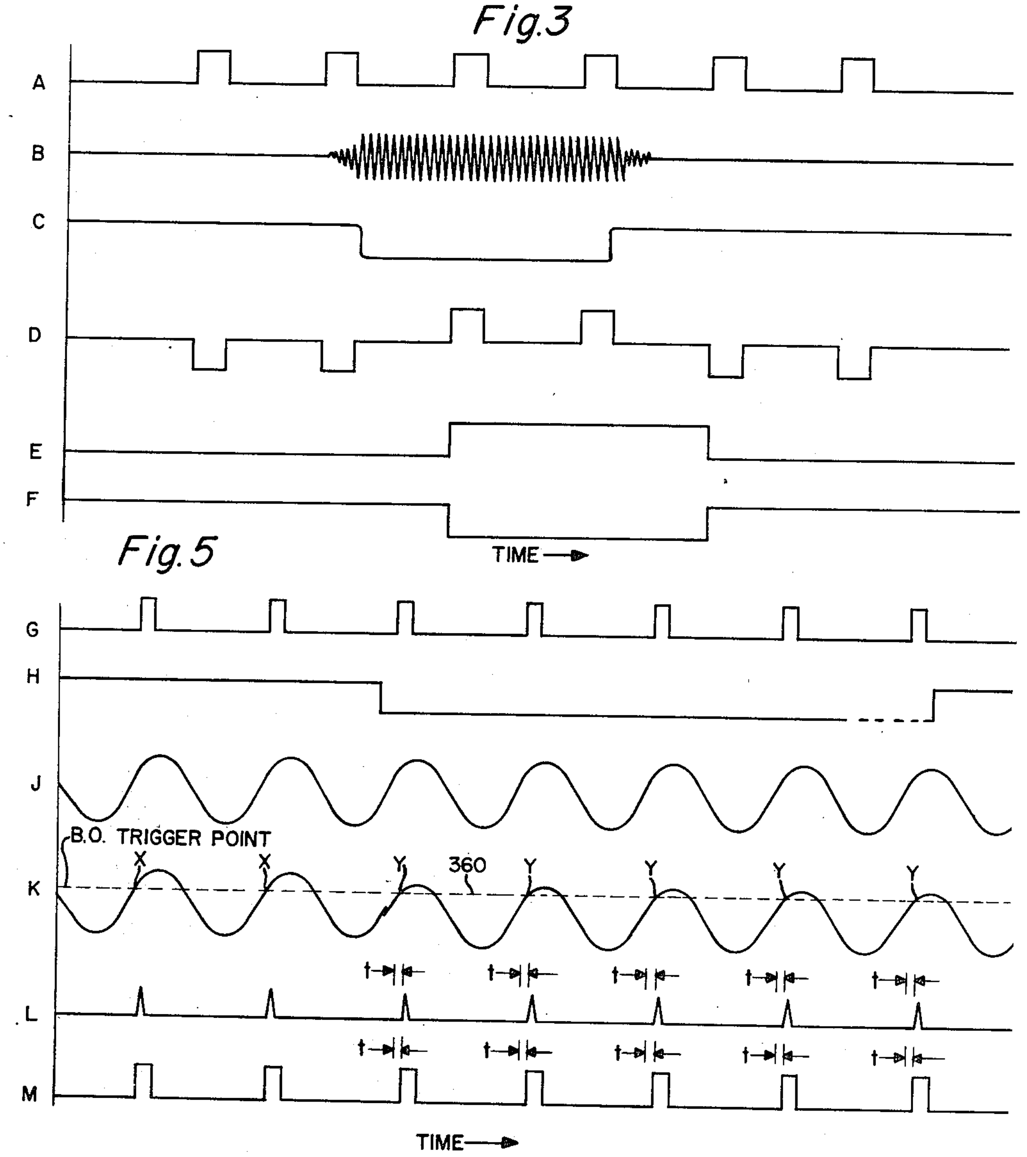
Figures 4, 6:
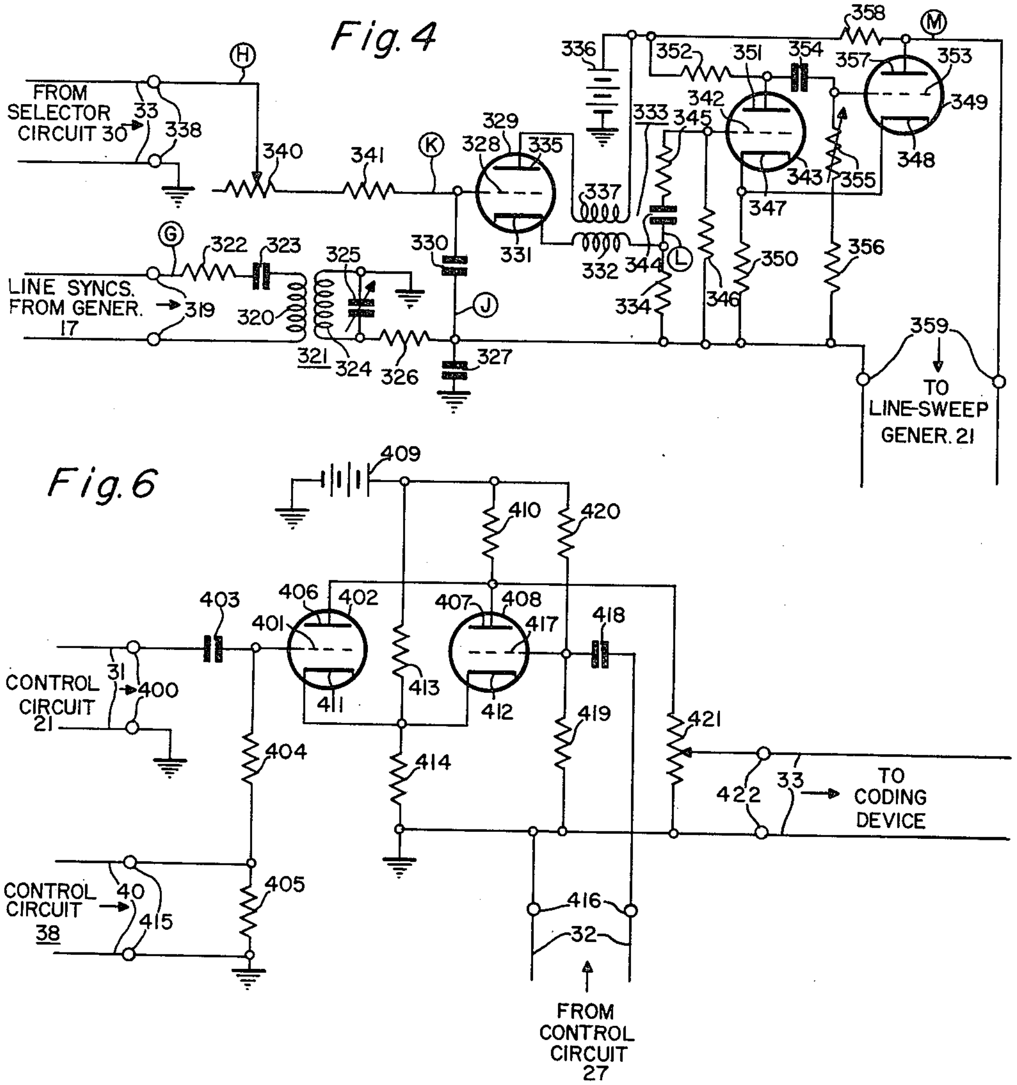
Figure 7:
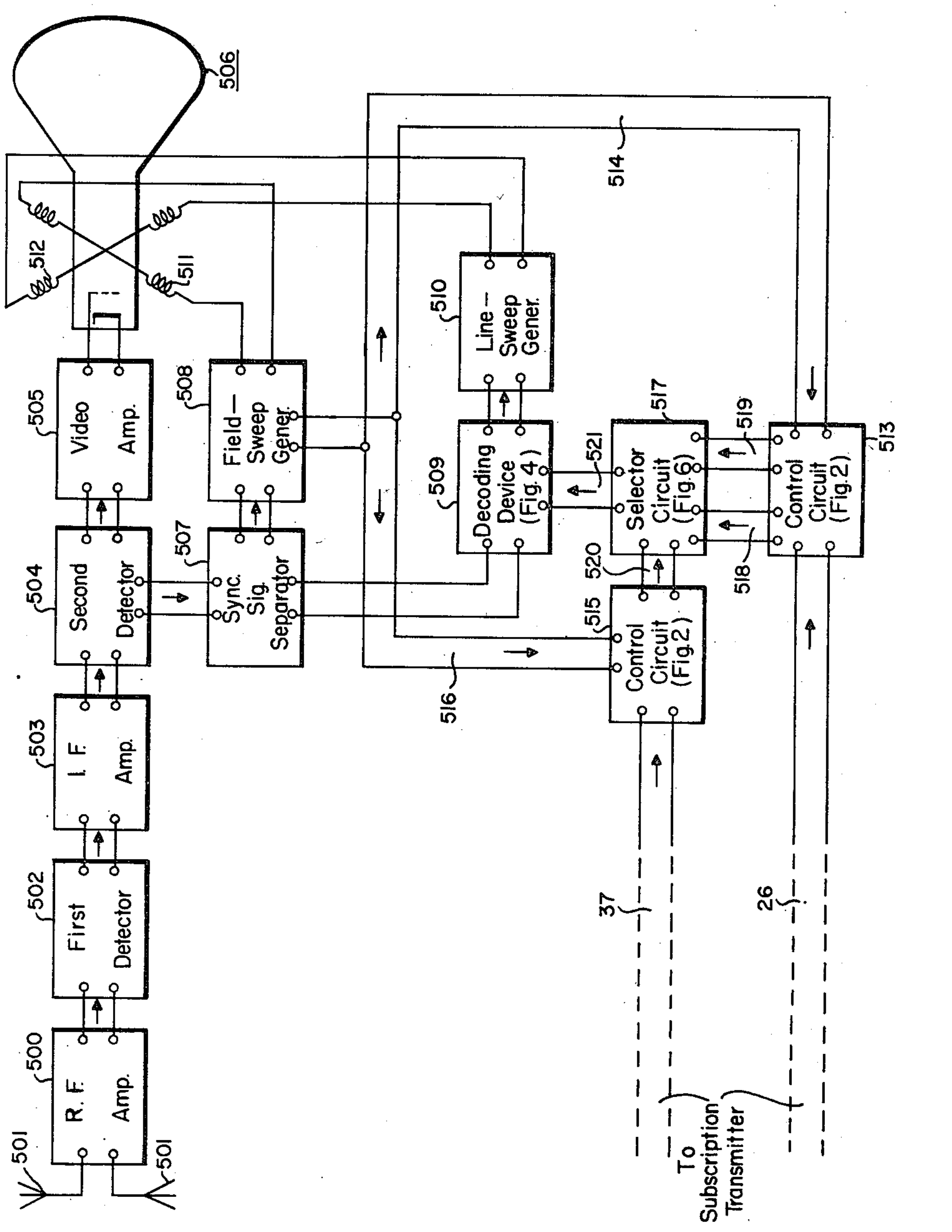

The features of the invention which are believed to be new are set forth with particularity in the appended claims. The invention itself, however, together with further objects and advantages thereof may best be understood by reference to the following description when taken in conjunction with the accompanying drawings, in which:

Figure 1 shows a subscription television transmitter constructed in accordance with the invention, Figure 2 is a schematic diagram of a coding component of the transmitter, Figure 3 comprises various curves illustrating the operation of the circuit of Figure 2, Figure 4 is a detailed diagram of another coding component of the transmitter, Figure 5 represents various curves indicating the operation of the circuit of Figure 4, Figure 6 illustrates yet another coding component of the transmitter of Figure 1, and, Figure 7 shows a receiver constructed to utilize the subscription television signal of the present system.

The transmitter of Figure 1 comprises a video-signal generator 10 of the iconoscope or other well-known type, connected to a video amplifier 11. The output terminals of video amplifier 11 are connected to a mixer amplifier 12 whose output terminals are connected through a direct-current inserter unit 13 to a carrier-wave generator and modulator 14. The output terminals of unit 14 may be connected to any suitable antenna circuit 15, 16. The transmitter includes a synchronizing-signal generator 17 connected to mixer amplifier 12 to supply line- and field-synchronizing and blanking pulses thereto in well-known manner. Generator 17 is connected to a field-sweep generator 18 and applies field-synchronizing pulses thereto. The output terminals of field-sweep generator 18 are connected to field-deflection elements 19 associated with generator 10.

The synchronizing-signal generator 17 is also connected through a coding device 20 to a line-sweep generator 21 to supply line-synchronizing pulses to the line-sweep generator. The timing of the line-synchronizing pulses applied to generator 21 is altered from time to time by coding device 20 in a manner to be described. The output terminals of line-sweep generator 21 are connected to line-deflection elements 22 associated with generator 10.

Synchronizing-signal generator 17 is further connected to a frequency divider 23 which may be of the random type disclosed in copending application Serial No. 32,457, Roschke, filed June 11, 1948, entitled "Random Frequency Divider" and assigned to the present assignee and now issued as Patent 2,588,413. The output terminals of frequency divider 23 are connected to a multivibrator 24 of the well-known "Eccles Jordan" type. That is, multivibrator 24 has two stable operating conditions and is triggered between these operating conditions by each frequency-divided pulse from divider 23. The multivibrator 24 is connected to a key-signal generator 25, and causes this generator to develop a key signal of a predetermined frequency during intervals when the multivibrator is in a selected one of its two operating conditions. The output terminals of key-signal generator 25 are connected to a line circuit 26 which may extend to the various subscriber receivers. The output terminals of key-signal generator 25 are further connected to a control circuit 27 by means of leads 28, the control circuit receiving field-synchronizing pulses from synchronizing-signal generator 17 by way of leads 29. Control circuit 27 has two pairs of output terminals which are respectively connected to a selector circuit 30 by means of leads 31, 32, the selector circuit being connected to coding device 20 by way of leads 33. Control circuit 27 and selector circuit 30 are both to be described in detail hereinafter.

Synchronizing-signal generator 17 is also connected to another frequency divider 34 which may be similar in construction to frequency divider 23 with the exception that it is preferable that divider 34 provide a frequency division of the field-synchronizing pulses between different limits than the frequency division of divider 23, for reasons to be explained. The output terminals of frequency divider 34 are connected to a multivibrator 35 which, as in the case of multivibrator 24, is of the "Eccles Jordan" type. Multivibrator 35 is connected to a key-signal generator 36 and causes this generator to develop a key signal of predetermined frequency during operating intervals in which multivibrator 35 is in a preselected one of its two operating conditions. The output terminals of key-signal generator 36 are connected to a line circuit 37 extending to the subscriber receivers.

It is to be understood that the key signals produced by generators 25 and 36 may be transmitted to subscriber receivers over separate line circuits 26, 37 (as shown); or when desired, a single line circuit may be used and the key signals transmitted thereover at different frequencies. Moreover, as previously mentioned one of the key signals may be transmitted over a line circuit and the other disseminated to subscriber receivers as a modulation component of the television signal.

Key-signal generator 36 is also connected to a control circuit 38 which may be similar in construction to control circuit 27. Control circuit 38 is further connected to synchronizing-signal generator 17 by way of leads 29 and 39 to derive field-synchronizing pulses therefrom. The output terminals of control circuit 38 are connected to selector circuit 30 by way of leads 40.

Coding device 20 is to be described in detail hereinafter in conjunction with Figure 4. For the purposes of understanding the operation of the transmitter, it is believed sufficient at the present time to state that the coding device translates the line-synchronizing pulses from generator 17 to line-sweep generator 21 with a preselected timing in the presence of what may be considered reference potential on leads 33. For example, when reference potential exists on leads 33, the line-synchronizing pulses may be translated by coding device 20 with no time delay. When the potential of leads 33 is positive with respect to this reference value, coding device 20 advances the timing of the line-synchronizing pulses translated thereby. On the other hand, when the potential of leads 33 is negative with respect to the reference value, coding device 20 retards the timing of line-synchronizing pulses translated thereby. Therefore, coding device 20 alters the timing of the line-synchronizing pulses applied to line-sweep generator 21, yet has no effect on the line-synchronizing pulses applied to mixer 12.

Video-signal generator 10 functions in well-known manner to generate a video signal indicating the shade variations of a subject scanned by the device. This video signal is amplified in video amplifier 11, and mixed in mixer amplifier 12 with the synchronizing and blanking components supplied thereto by generator 17 to produce a composite television signal at the output terminals of the mixer amplifier. The low-frequency components are inserted into the television signal by unit 13, and it is then applied to unit 14 wherein it is modulated on a picture carrier wave and radiated over antenna circuit 15, 16.

The field deflection of generator 10 is controlled by means of field-sweep generator 18 which supplies field-deflection currents to field-deflection elements 19 in synchronism with the field-synchronizing pulses generated by generator 17. The line deflection of generator 10 is controlled by line-sweep generator 21 which supplies line-deflection currents to line-deflection elements 22 in synchronism with the synchronizing pulses applied to generator 21 from coding device 20.

Field-synchronizing pulses derived from generator 17 are divided in divider 23 and utilized to actuate multivibrator 24 from one of its stable operating conditions to the other from time to time so that the multivibrator is in its second stable operating condition during spaced operating intervals, and causes key-signal generator 25 to generate bursts of key signal on line circuit 26 during such intervals. The spaced intervals occur during random times determined by the division ratio of divider 23 and, since multivibrator 24 is actuated by field-synchronizing pulses, the bursts of key signal on line circuit 26 are initiated and terminated during field-retrace intervals. These bursts of key signal are applied to control circuit 27 which responds to the joint application of the key-signal bursts and the field-synchronizing pulses to provide a signal having positive pulse components on leads 31, and a signal having negative pulse components on leads 32. The positive and negative pulse components occur in time coincidence and have a duration corresponding to the duration of each key-signal burst. However, due to the action of control circuit 27 each of these pulse components is initiated and terminated during the field-retrace intervals immediately following the initiation and termination of each corresponding burst of key signal. The purpose of this action of the control circuit is to be explained presently.

Field-synchronizing pulses derived from generator 17 are also applied to frequency divider 34 wherein they are frequency divided at a random rate but, as previously stated, at a rate preferably different from the division rate of divider 23. The frequency divided pulses from divider 34 actuate multivibrator 35 from one of its stable operating conditions to the other so that the multivibrator remains in its second operating condition during spaced intervals determined by the division ratio of divider 34, and the multivibrator causes key-signal generator 36 to supply bursts of key signal to line circuit 37 during these intervals. These latter bursts of key signal are also initiated and terminated during field-retrace intervals since multivibrator 35 is triggered by field-synchronizing pulses.

The bursts of key signal on line circuit 37 are applied to control circuit 38 which may be similar in construction to unit 27, and acts in response to the joint application of the key-signal bursts and the field-synchronizing pulses on leads 39 to produce control pulses on leads 40. These control pulses have a duration corresponding to each burst of key signal on line circuit 37, but are initiated and terminated during field retrace intervals immediately following the initiation and termination of each key-signal burst, for reasons to be explained.

During the intervals between the bursts of key signal on line circuit 26, control circuit 27 develops what may be termed a reference potential on leads 31 and 32, and leads 33 are also established at a reference potential. As previously described, during such intervals coding device 20 translates the line-synchronizing pulses to line-sweep generator 21 with unaltered timing, and under this condition the transmission of the television signal may be considered to be in a first mode. Whenever a burst of key signal is developed on line circuit 26, and for the duration of such a burst, control circuit 27 supplies a positive pulse to selector circuit 30 over leads 31 and a coincident negative pulse to the selector over leads 32. The selector circuit determines whether the positive-pulse signal of leads 31 or the negative-pulse signal of leads 32 is to be translated to leads 33 to increase or decrease the potential of these leads and, thus, advance or retard the timing of the line-synchronizing pulses as translated by coding device 20.

The selector circuit is actuated in accordance with a coding schedule indicated to subscriber receivers by the bursts of key signal from generator 36 appearing on line circuit 34. For the duration of each burst of key signal on line circuit 37, control circuit 38 supplies a positive control pulse to selector circuit 30 over leads 40. This causes the selector to translate solely the positive-pulse signal from leads 31 to leads 33 to increase periodically the potential of leads 33 and, hence, advance periodically the timing of the pulses applied to line-sweep generator 21. On the other hand, during the intervals between the bursts of key signal on line circuit 37, control circuit 38 actuates the selector circuit so that solely the negative-pulse signal from leads 32 is translated to leads 33 to decrease periodically the potential on leads 33 and therefore, retard periodically the timing of the pulses applied to sweep generator 21.

In this manner, during spaced intervals determined by the bursts of key signal on line circuit 26, coding device 20 causes the timing of the line-synchronizing pulses applied to line-sweep generator 21 to be altered from a first value to either an advanced or retarded value. The latter two values are selected in accordance with a prescribed coding schedule indicated to subscriber receivers by the key signal on line circuit 37. It will be appreciated that any change in the timing of the line-sweep generator causes a corresponding change in the time relation of the video and line synchronizing components of the radiated television signal. This causes the television signal to be effectively coded since receivers of the non-subscriber type require a fixed time relation between these components of the television signal for proper utilization of the signal and reproduction of the image intelligence represented thereby. The mode changes in the television signal occur at times determined by the division ratio of dividers 23, 34. It is desirable that the division ratio of these dividers be between different limits so that selector circuit 30 may be actuated at a reduced rate by control circuit 38 as compared with the intervals during which the pulse components occur in the the control signals on leads 31 and 32. This insures that during certain intervals the pulse components on leads 31 are translated to the leads 33 and during other intervals the pulse components on leads 32 are translated to leads 33.

It has been pointed out that control circuits 27, 38 operate to supply the various pulse components to the selector circuit during intervals which are initiated and terminated during the field-retrace intervals respectively succeeding the initiation and termination of the corresponding key-signal bursts. The purpose of this delayed action in the control circuits is to insure that slight time delays in the line circuits conducting the key signals do not adversely affect the operation of compensating or decoding networks at the subscriber receivers which must function in time coincidence with mode changes in the received television signal. Moreover, the pulses applied to selector circuit 30 by way of leads 31, 32 and 40 are initiated and terminated during field retrace intervals so that mode changes in the television signal occur during such retrace intervals to obviate the possibility of distortion in the images reproduced by the subscriber receivers, as might occur should such mode changes occur during trace intervals.

A detailed diagram of a circuit that may be used to constitute a control circuit 27 is illustrated in Figure 2 and, as previously mentioned, unit 38 may have the same construction. The circuit, which is described and claimed in copending application Serial No. 341,681, filed in the name of Pierce E. Reeves on March 11, 1953 and assigned to the present assignee, includes a pair of input terminals 150 connected to key-signal generator 25. Terminals 150 are connected to the primary winding 151 of a transformer 152 having a secondary winding 153 coupled to the control electrode 154 of an electron-discharge device 155 through a coupling capacitor 156 and to ground through a resistor 157. Control electrode 154 is connected to ground through a grid-leak resistor 158 and cathode 159 is connected to ground through a resistor 160 shunted by a capacitor 161. Anode 162 of device 155 is connected to the positive terminal of a source of unidirectional potential 163 through a load resistor 164, and cathode 159 is connected to this terminal through a resistor 165. Device 155 serves as an amplifier for the key signal received from the particular key-signal generator and, in view of the cathode bias provided by the potentiometer arrangement of resistors 160, 165, it responds only when the amplitude of the key signal exceeds a preselected threshold value.

Anode 162 is coupled to a rectifier device 166 through a coupling capacitor 167. The amplifier is made regenerative by means of a transformer 168 having a primary winding 169 one side of which is connected to the junction of capacitor 167 and rectifier 166 while its other side is coupled to this junction through a capacitor 170. The secondary winding 171 of transformer 168 has one side connected to the primary winding and to ground, and its other side connected to the junction of winding 153 and resistor 157. The rectifier 166 is connected to the control electrode 172 of an electron-discharge device 173 through a resistor 174, and to ground through a resistor 175 shunted by a capacitor 176. Cathode 177 of device 173 is directly connected to cathode 159 of device 155, and anode 178 of device 173 is connected to the positive terminal of source 163 through a load resistor 179 and to ground through a resistor 180.

The control circuit of Figure 2 has a second pair of input terminals 181 which are connected to generating unit 17. One of the terminals 181 is connected to ground and the other is coupled to control electrode 172 of device 173 through a series-connected resistor 182 and capacitor 183. The ungrounded terminal 181 is also coupled to anode 178 of device 173 through a series-connected resistor 184 and capacitor 185.

Anode 178 is further coupled to the control electrode 186 of an electron-discharge device 187 through a capacitor 188, the control electrode being connected to ground through a grid-leak resistor 189. Cathode 190 of device 187 is directly connected to cathode 191 of an electron-discharge device 192, and these cathodes are connected to ground through a common resistor 193. Anode 194 of device 187 is connected to the positive terminal of source 163 through a resistor 195, and is coupled to control electrode 196 of device 192 through a capacitor 197; the control electrode being connected to cathodes 190, 191 through a resistor 198. Anode 199 of device 192 is connected to the positive terminal of source 163 through a resistor 200 and to control electrode 186 of device 187 through a resistor 201. The devices 187 and 192 form a single-shot multivibrator and may be triggered from one operating condition to another by pulses of one polarity and returned to the first operating condition by pulses of a second polarity. The construction and operation of this type of multivibrator circuit are well-known in the art.

Anode 199 is connected to the control electrode 202 of an electron-discharge device 203 through a limiting resistor 204, the control electrode being connected to ground through a resistor 205. Cathode 206 of device 203 is connected to ground through a cathode resistor 207, and its anode 208 is connected to the positive terminal of source 163 through a resistor 209. Anode 208 is connected to ground through series-connected resistors 210 and 211. The device 203 is a phase inverter for inverting the output signal from the preceding multivibrator and for supplying this signal to output terminals 212 so that it has pulse components of negative polarity with respect to a reference level. Terminals 212 are connected to selector 230 by way of leads 32.

Anode 199 of device 192 is connected to ground through series resistors 213 and 214, and a signal produced by the multivibrator is derived across resistor 214 and supplied to output terminals 215 with pulse components of positive polarity with respect to a reference level occurring in time coincidence with the negative pulse components derived across terminals 212. Terminals 215 are connected to selector circuit 30 by way of leads 31. The amplitudes of the pulses supplied to the selector circuit over leads 31, 32 may be respectively varied by adjustment of the movable taps on resistors 214, 211.

The operation of the circuit of Figure 2 may best be understood by reference to the curves of Figure 3. The field-synchronizing pulses from generator 17 are impressed across terminals 181 with a wave form shown in curve A. These pulses are supplied to control electrode 172 of device 173 through network 182, 183, and to the junction of anode 178 and resistor 180 through network 184, 185. The bursts of key-signal generated by key-signal generator 25 are impressed across terminals 150 and each burst has a wave form shown in curve B. The key-signal bursts are amplified in device 155, rectified by device 166 and supplied to control electrode 172 with a wave form shown in curve C. When the rectified signal of curve C has a maximum negative amplitude, device 173 is rendered non-conductive.

During the intervals between bursts of key signal, the field-synchronizing pulses are amplified by device 173 and applied to control electrode 186 of device 187 with negative polarity. In addition, the field-synchronizing pulses are applied directly to control electrode 186 by way of network 184, 185 with positive polarity. The amplification of device 173 is, preferably, made such that under these conditions the resultant pulses applied to control electrode 186 have negative polarity and an amplitude substantially equal to that of the field-synchronizing pulses as applied to terminals 181. However, during the occurrence of each burst of key signal, and when the rectified signal of curve C has its maximum negative value, device 173 is rendered non-conductive and the field-synchronizing pulses are applied to control electrode 186 only by way of network 184, 185 and with positive polarity. As shown in curve D, the pulses applied to control electrode 186 are of negative polarity until the occurrence of each burst of key signal, at which time the next succeeding field pulses are of positive polarity. The field-synchronizing pulses applied to control electrode 186 following the termination of each key-signal burst again have negative polarity.

The multivibrator circuit comprising devices 187, 192 is triggered from one operating condition to the other by the first field-synchronizing pulse succeeding the initiation of each key-signal burst and is returned to its first operating condition by the first field-synchronizing pulse following the termination of each such burst. The multivibrator, therefore, supplies a signal to control electrode 202 of device 203, and to output terminals 215 having positive pulse components determined by each key-signal burst such as shown in curve E yet initiated and terminated in the field-retrace intervals immediately following the initiation and termination of each such burst. The device 203 inverts the phase of these positive pulse components and supplies a signal with coincident negative pulse components, shown in curve F, to output terminals 212.

The control circuit acts, therefore, during spaced operating intervals to supply a pulse to selector circuit 30 over leads 31 which is positive as compared with the reference potential level of these leads and to supply a coincident pulse to the selector over leads 32 which is negative as compared with the reference potential level. The positive and negative excursions of the pulses applied to the selector circuit over leads 31 and 32 occur during spaced intervals determined by the bursts of key signal on line circuit 26, and during the field retrace intervals following the initiation and termination of each key-signal burst. As previously pointed out, the circuit of Figure 2 may be utilized as control circuit 38 to supply a positive pulse to selector circuit 30 from terminals 215 over leads 40 during spaced intervals corresponding to the bursts of key signal on line circuit 37, yet initiated and terminated during the field-retrace intervals immediately following the initiation and termination of such bursts. For this latter control circuit output terminals 215 only are used.

The coding device 20, shown in detail in Figure 4, includes a first pair of input terminals 319 which are connected to generator 17 to derive line-synchronizing pulses therefrom. The terminals 319 are connected to the primary winding 320 of a transformer 321 through series-connected resistor 322 and capacitor 323. Secondary winding 324 of transformer 321 is shunted by a capacitor 325, one side of the secondary winding being connected to ground. The other side of the secondary winding 324 is coupled to ground through a phase-shifting network comprising a resistor 326 and a capacitor 327, the junction thereof being coupled to the control electrode 328 of an electron-discharge device 329 through a capacitor 330. Device 329 is connected as a blocking oscillator and its cathode 331 is connected to ground through a winding 332 of a transformer 333 and a resistor 334. Anode 335 of device 329 is connected to the positive terminal of a source of unidirectional potential 336 through a winding 337 of transformer 333.

The coding device has a second pair of input terminals 338 connected to selector circuit 30 over leads 33. One of the terminals 338 is connected to ground and the other is connected to control electrode 328 of device 329 through an adjustable resistor 340 and a resistor 341.

The junction of winding 332 and resistor 334 is coupled to the control electrode 342 of an electron-discharge device 343 through series-connected capacitor 344 and resistor 345, the control electrode being connected to ground through a resistor 346. Cathode 347 of device 343 is directly connected to cathode 348 of an electron-discharge device 349, these cathodes being connected to ground through a common cathode resistor 350. Anode 351 of device 343 is connected to the positive terminal of source 336 through a resistor 352 and is coupled to the control electrode 353 of device 349 through a capacitor 354. Control electrode 353 is connected to ground through series-connected adjustable resistor 355 and resistor 356, and its anode 357 is connected to the positive terminal of source 336 through a resistor 358. The output terminals 359 of the coding device are connected to line-sweep generator 21, one of these output terminals being connected to ground and the other to anode 357.

The devices 343, 349 form a multivibrator circuit which is triggered by the output pulses from the preceding blocking oscillator. The time-constant of the multivibrator circuit may be varied by adjustment of resistor 355 in well-known manner, and the resistor is adjusted to provide pulses of a desired individual duration across terminals 359.

The operation of the circuit of Figure 4 may best be understood by reference to the curves of Figure 5. Line-synchronizing pulses from generator unit 17 are impressed across terminals 319 and supplied to primary winding 320 of transformer 321. Secondary winding 324 of the transformer is tuned to the repetition frequency of these pulses by means of capacitor 325, and a sine wave is produced across the secondary winding. This sine wave is phase shifted in network 326, 327, and is applied to control electrode 328 of device 329 as represented by curve J. The control signal from selector circuit 30 is impressed across terminals 338 and applied to control electrode 328 through resistors 340 and 341. As previously described, this control signal has negative or positive pulse components determined by the operating condition of the selector circuit established by control circuit 38. It is assumed for purposes of explanation, that the selector circuit is actuated so that the control signal has negative pulse components such as shown in curve H, which act in a manner to be described to retard the timing of the pulses supplied to line-sweep generator 21 by the coding device.

The composite signal applied to control electrode 328 is shown in curve K and consists of the sine wave of curve J added to the control signal of curve H. During the intervals between the negative pulse components of the signal of curve H, blocking oscillator 329 is triggered at a certain point in each cycle of the sine wave. This point is designated *x* in curve K and corresponds to the time the signal of curve K increases beyond the blocking oscillator triggering point shown by the broken line 360. The blocking oscillator triggering point may be adjusted by variation of resistor 340 which is in the discharge path of capacitor 330 and thus determines the time-constant of the oscillator. For the duration of each negative-pulse component of the signal of curve H, the triggering of the blocking oscillator occurs at a point *y* in each cycle of the signal of curve K. That is, the triggering of the blocking oscillator is delayed by a time "*t*" with respect to the triggering during the intervals between the negative-pulse components of the control signal.

It will be appreciated that when the selector circuit is actuated so that the control signal has positive pulse components, the triggering of the blocking oscillator may be advanced for the duration of each component by a similar time "*t*" with respect to the triggering during the intervals between these components.

Each time the blocking oscillator is triggered, a sharp pulse appears across resistor 334 in the cathode circuit of device 329. These pulses are shown in curve L and are applied to the multivibrator circuit of devices 343, 349 which responds and applies output pulses to terminals 359 as shown in curve M. As previously mentioned, the individual duration of each of the output pulses may be adjusted by variation of resistor 355, and the widths of these pulses are usually adjusted to correspond to those of the usual line-synchronizing pulses. These output pulses are applied to line-sweep generator 21 to control the operation of this generator.

Therefore, it can be seen that the coding device supplies synchronizing pulses to line-sweep generator 21 having the same phase or timing, as compared with the line-synchronizing pulses from generator 17, during intervals when the control signal applied across terminals 338 has a reference potential value. The timing of the output pulses is advanced relative to the line-synchronizing pulses for the duration of each positive pulse component of the control signal applied to terminals 338. Conversely, the timing of the output pulses relative to the line-synchronizing pulses is retarded for the duration of each negative pulse component of the control signal applied to terminals 338.

One embodiment of selector circuit 30, shown in Figure 6, includes a pair of input terminals 400 connected to control circuit 27 by way of leads 31. One of the terminals 400 is grounded and the other is coupled to a control electrode 401 of an electron-discharge device 402 through a coupling capacitor 403, control electrode 401 being connected to ground through series-connected resistors 404, 405. The anode 406 of device 402 is directly connected to the anode 407 of an electron-discharge device 408, the anodes being connected to the positive terminal of a source of unidirectional potential 409 through a load resistor 410. The cathode 411 of device 402 is directly connected to the cathode 412 of device 408, the cathodes being connected to the junction of resistors 413, 414 which, in turn, are connected as a potentiometer between the positive terminal of source 409 and ground. The circuit also has a second pair of input terminals 415 connected to control circuit 38 by way of leads 40. One of the terminals 415 is grounded and the other connected to the junction of resistors 404, 405.

The selector circuit includes yet a further pair of input terminals 416 connected to control circuit 27 by way of leads 32. One of the terminals 416 is grounded and the other is coupled to control electrode 417 of discharge device 408 through a coupling capacitor 418, control electrode 417 being connected to ground through a resistor 419 and to the positive terminal of source 409 through a resistor 420. Anodes 406, 407 are connected to ground through a resistor 421. The circuit includes a pair of output terminals 422 connected to ground and to a movable tap on resistor 421, these terminals connecting the circuit to coding device 20 by means of leads 33.

During the intervals between the key-signal bursts on line circuit 26, the control signals applied to terminals 400 and 416 have a certain reference value, and this value is such that a predetermined space current flows through load resistor 410 to establish a reference potential level across output terminals 422.

During the spaced operating intervals when a burst of key signal appears on line circuit 26, control circuit 27 supplies a positive pulse component of its control signal to terminals 400 and the negative pulse component thereof to terminals 416 as previously explained. Should key-signal generator 36 develop a burst of key signal on line circuit 37 at this time, control circuit 38 applies the positive pulse component of its control signal to terminals 415. The combined positive pulse components of the signals applied to terminals 400 and 415 render device 402 highly conductive and the space current flowing through this device gives rise to a voltage drop across load resistor 410 so as to establish a potential across terminals 422 which is negative compared to the reference potential level. The space current flowing through device 402 causes a potential drop across cathode resistor 414 which has such a value that it renders device 408 non-conductive and the negative pulse component of the control signal applied across terminals 416 has no effect on the output potential across terminals 422.

On the other hand, should key-signal generator 25 develop a burst of key signal on line circuit 26, during an interval when no burst of key signal is developed on line circuit 37, the control signal from control circuit 38 applied to terminals 415 has a decreased potential corresponding to its reference level. During this latter condition, the positive pulse component of the control signal from control circuit 27 applied across terminals 400 is insufficient to overcome the bias of device 402 established by potentiometer 413, 414, and this device is non-conductive. Device 408, however, is conductive by reason of the biasing action of potentiometers 419, 420 and the negative pulse component of the control signal from control circuit 27 applied across terminals 416 decreases the conduction of device 408 so that the potential drop across load resistor 410 provides a control potential across terminals 422 that is positive with respect to its above-mentioned reference level.

Therefore, during intervals when no key signal bursts appear on line circuits 26, 37 a reference potential is established across output terminals 422 which causes coding device 20 to apply synchronizing pulses to the line-sweep generator in phase with the line-synchronizing pulses. When a key signal burst appears on line circuit 26 but not on line circuit 37, a negative potential relative to the reference level is established across terminals 422 which causes coding device 20 to delay the line-synchronizing pulses translated thereby by a preselected amount. Conversely, when a burst of key signal developed on line circuit 26 is accompanied by a burst of key signal on line circuit 37, the selector circuit establishes a potential across terminals 422 that is positive with respect to the reference level and causes coding device 20 to advance the timing of the line-synchronizing pulses translated thereby.

Figure 7 illustrates a subscriber receiver constructed to utilize the signals developed by the transmitter of Figure 1. The receiver includes a radio-frequency amplifier 500 of any desired number of stages having input terminals connected to an appropriate antenna circuit 501 and output terminals connected to a first detector 502. The first detector is coupled to an intermediate-frequency amplifier 503 of any desired number of stages which, in turn, is connected to a second detector 504. The output terminals of second detector 504 are connected through a video amplifier 505 of one or more stages to the input electrodes of an image-reproducing device 506.

Second detector 504 is also connected to a synchronizing-signal separator 507 which is coupled to a field-sweep generator 508, and through a decoding device 509 to a line-sweep generator 510. The output terminals of sweep generators 508, 510 are connected respectively to field-deflection elements 511 and line-deflection elements 512 associated with reproducing device 506.

Line circuit 26 extending to the transmitter is connected to a control circuit 513, the control circuit deriving field-synchronizing pulses from field-sweep generator 508 by means of leads 514. Line circuit 37 extending to the transmitter is conected to a control circuit 515 which derives field-synchronizing pulses from the field-sweep generator by way of leads 516. Control circuit 513 is connected to a selector circuit 517 over leads 518, 519 and control circuit 515 is connected to the selector circuit over leads 520. The selector circuit, in turn, is connected to decoding device 509 over leads 521.

The television receiver of Figure 7 may be tuned to receive the signal transmitted by the transmitter of Figure 1. This signal is intercepted by antenna 501 and amplified in radio-frequency amplifier 500. The amplified signal is heterodyned to the selected intermediate frequency of the receiver in first detector 502 and the resulting intermediate-frequency signal is amplified in intermediate-frequency amplifier 503. The intermediate-frequency signal is detected in second detector 504 to produce a composite video signal which is amplified in video amplifier 505 and applied to the input electrodes of reproducing device 506 to control the intensity of the cathode-ray beam developed therein in well-known manner.

The synchronizing components of the received television signal are separated therefrom in synchronizing-signal separator 507, the field-synchronizing components being utilized to synchronize the frequency of sweep generator 508 and, hence, the field deflection of device 506 with the incoming television signal. The line-synchronizing components are applied to line-sweep generator 510 through decoding device 509 so that the timing of the line scansion of device 506 may be altered in time coincidence with the aforedescribed alterations in the timing characteristic of the received signal.

As previously pointed out, each burst of key signal on line circuit 26 indicates that during the field-retrace interval succeeding the initiation of the burst a mode change is to occur in the timing characteristic of the received television signal between the video and line-synchronizing components from a first mode to either one of a second and a third mode, this mode change to continue until the field-retrace interval following the termination of each burst. The bursts of key signal on line circuit 26 are applied to control circuit 513 which may be similar in construction to control circuit 27 at the transmitter (as shown in detail in Figure 2). Control circuit 513 supplies a control signal with positive pulse components to selector circuit 517 over leads 518 and a control signal with coincident negative pulse components to the selector over leads 519. These pulse components are initiated and terminated by control circuit 513 during the field-retrace intervals following the initiation and termination of each burst of key signal on line circuit 26 and, thus, occur in time coincidence with similar pulse components on leads 31 and 32 at the transmitter, regardless of slight time delays in the key-signal bursts during their transmission over line circuit 26.

As also previously discussed, the bursts of key signal occurring on line circuit 37 indicate whether the second or third mode of the television signal has been selected during the spaced intervals indicated by the key-signal bursts of line circuit 26. The bursts of key signal on line circuit 37 are applied to control circuit 515, which may be similar in construction to control circuit 38 at the transmitter. Control circuit 515 supplies a control signal with positive pulse components to selector circuit 517, these components each being initiated and terminated during the field-retrace intervals immediately following the initiation and termination of each burst of key signal on line circuit 37. A positive pulse component on leads 20 causes selector circuit 517 to develop a positive pulse component on leads 512 in time coincidence with a corresponding positive pulse component on leads 33 from selector circuit 30 at the transmitter. The positive pulse component on leads 521 causes decoding device 509 to advance the timing of the synchronizing pulses applied to line-sweep generator 510 at the same time when coding device 20 at the transmitter advances the timing of the line-synchronizing pulses applied to line-sweep generator 21, and by the same amount. Likewise, when the potential on leads 520 drops to its reference value, selector circuit 517 develops a negative pulse component on leads 512 in time coincidence with a corresponding negative pulse component on leads 33 at the transmitter. The negative pulse component on leads 521 causes decoding device 509 to retard the timing of the synchronizing pulses in time coincidence with a similar retardation at the transmitter. Decoding device 509 may be similar in construction to coding device 20, as discussed in detail in conjunction with Figure 4.

The operation of the receiver is such, therefore, that the timing changes of the received television signal between the various modes is compensated by decoding device 509 which imparts similar timing changes to the line scansion of image-reproducing device 506. In this manner, the television receiver may utilize and reproduce the received subscription television signal.

It is apparent that essentially the same structure is employed to accomplish decoding in the receiver as that relied on to effect coding at the transmitter. Accordingly, in the following claim program the expression "encoding" is employed in its generic sense to embrace this structure when utilized for coding at the transmitting end or for decoding at the receiving end of the system.

As previously pointed out, it may be desirable to transmit one or the other of the key signals as a modulation component of the television signal to obviate the need for two line circuits; or when so desired, the key signals may be transmitted over a single line circuit at different frequencies and separated one from the other at the receiver by means of selective filters. As also pointed out, it is not intended that the invention be limited to any particular mode change in the television signal, the concept of the invention being that a characteristic of the television signal be altered from one mode to any one of a plurality of other modes during spaced time intervals; that a first key signal indicate the spaced intervals; and a second key signal resolve the ambiguity as to which one of the other modes has been selected during the spaced intervals.

Therefore, while a particular embodiment of the invention has been shown and described modifications may be made and it is intended in the appended claims to cover all such modifications as may fall within the true spirit and scope of the invention.

I claim:

1. A subscription type of television transmitter comprising: a generator for developing a television signal representing a scanned subject and for transmitting said signal to subscriber receivers; coding apparatus coupled to said generator for selectively varying the transmission of said signal between a plurality of different transmitting modes during spaced operating intervals; a control circuit for controlling said coding apparatus to determine a first group of spaced operating intervals in each of which a variation is effected in the mode of transmission; a selector device controlling said coding apparatus to determine a second group of spaced operating intervals in certain of which a mode variation is likewise effected and also to determine the particular one of said plurality of modes selected by said coding apparatus during said spaced operating intervals of both said groups; and means coupled to said selector device for actuating said device in accordance with a coding schedule.

2. A subscription type of television transmitter comprising: a generator for developing a television signal representing a scanned subject and for transmitting said signal to subscriber receivers; coding apparatus coupled to said generator for selectively varying the transmission of said signal from a first transmitting mode to second and third transmitting modes during spaced operating intervals; a control circuit for controlling said coding apparatus to determine a first group of spaced operating intervals in each of which a variation is effected in the mode of transmission; a selector device controlling said coding apparatus to determine a second group of spaced operating intervals in certain of which a mode variation is likewise effected and also to determine the particular one of said second and third modes selected by said coding apparatus during said spaced operating intervals of both said groups; and means coupled to said selector device for actuating said device at a prescribed random rate.

3. A subscription type of television transmitter comprising: a video-signal generator for developing a video signal representing a scanned subject; a mixer amplifier coupled to said video-signal generator for producing a television signal; means coupled to said mixer for transmitting said television signal to subscriber receivers; coding apparatus coupled to said video-signal generator for varying selectively the transmission of said television signal between a plurality of different transmitting modes during spaced operating intervals; a control circuit for controlling said coding apparatus to determine, in accordance with a coding schedule, a first group of spaced operating intervals in each of which a variation is effected in the mode of transmission; a selector device controlling said coding apparatus to determine a second group of spaced operating intervals in certain of which a mode variation is likewise effected and also to determine the particular one of said plurality of modes selected by said coding apparatus during said spaced operating intervals of both said groups; means coupled to said selector device for actuating said device in accordance with a coding schedule; and a key-signal generator for producing a key signal representative of one of said coding schedules for transmission to said subscriber receivers.

4. A subscription type of television transmitter comprising: a video-signal generator for developing a video signal representing a scanned subject; a mixer amplifier coupled to said video-signal generator for producing a television signal; means coupled to said mixer for transmitting said television signal to subscriber receivers; coding apparatus coupled to said video-signal generator for varying selectively the transmission of said television signal between a plurality of different transmitting modes during spaced operating intervals; a control circuit for controlling said coding apparatus to determine the spaced operating intervals in which the variation is effected in the mode of transmission; a first key-signal generator coupled to said control circuit for producing a first key signal indicating said spaced intervals; a selector device controlling said coding apparatus to determine the particular one of said plurality of modes selected by said coding apparatus during said spaced operating intervals; a second control circuit coupled to said selector device for actuating said device in accordance with a coding schedule; and a second key-signal generator coupled to said second control circuit for producing a second key signal indicating said coding schedule.

5. A subscription type of television transmitter comprising: a video-signal generator for developing a video signal representing a scanned subject; a mixer amplifier coupled to said video-signal generator for producing a television signal; means coupled to said mixer for transmitting said television signal to subscriber receivers; coding apparatus coupled to said video-signal generator for selectively varying a timing characteristic of said television signal from a first preselected value to alternatively selected second and third preselected values during spaced operating intervals; a control circuit for controlling the coding apparatus to determine the spaced operating intervals in which the variation is effected in said timing characteristic; a first key-signal generator coupled to said control circuit for producing a first key signal indicating said spaced intervals; a selector device controlling said coding apparatus to determine the particular one of said second and third values selected by said coding apparatus during said spaced operating intervals; a second control circuit coupled to said selector device for actuating said device in accordance with a coding schedule; and a second key-signal generator coupled to said second control circuit for producing a second key signal indicating said coding schedule for transmission to said remote point.

6. A subscription type of television receiver for utilizing a television signal having its transmission varied selectively during spaced operating intervals between a plurality of different modes selected in accordance with first and second prescribed coding schedules, said receiver comprising: an image-reproducing device; circuit means for supplying said television signal to said reproducing device; decoding apparatus coupled to said circuit means for effecting during said spaced intervals variations in the operating mode of said receiver as between a corresponding plurality of operating modes; a control circuit for controlling said decoding apparatus in accordance with said first coding schedule to determine a first group of spaced operating intervals in each of which a mode variation is effected; a selector device controlling said decoding apparatus to determine a second group of spaced operating intervals in certain of which a mode variation is likewise effected and also to determine the particular one of said plurality of receiver modes to be established by said decoding apparatus in said intervals of both said groups; and means coupled to said selector for actuating said selector in accordance with said second coding schedule to compensate for said mode variations of said television signal.

7. A subscription type of television receiver for utilizing a television signal having its transmission varied selectively during spaced operating intervals from a first mode to second and third modes selected at first and second prescribed random rates, said receiver comprising: an image-reproducing device; circuit means for supplying said television signal to said reproducing device; decoding apparatus coupled to said circuit means for effecting during said spaced intervals variations in the operating mode of said receiver as between a corresponding second and third operating mode; a control circuit for controlling said decoding apparatus at said first random rate to determine a first group of spaced operating intervals in each of which a mode variation is effected; a selector device controlling said decoding apparatus to determine a second group of spaced operating intervals in certain of which a mode variation is likewise effected and also to determine the particular one of said second and third receiver modes to be established by said decoding apparatus in said intervals of both said groups; and means coupled to said selector for actuating said selector at said second random rate to compensate for said mode variations of said television signal.

8. A subscription type of television receiver for utilizing a television signal having its transmission varied selectively during spaced operating intervals between a plurality of different modes selected in accordance with a prescribed coding schedule, and for further utilizing first and second key signals at least one of which is received concurrently with said television signal and respectively indicating said spaced intervals and said coding schedule, said receiver comprising: an image-reproducing device; circuit means for supplying said television signal to said reproducing device; decoding apparatus coupled to said circuit means for effecting variations in the operating mode of said receiver as between a corresponding plurality of operating modes; means for applying said first key signal to said decoding apparatus to actuate said apparatus during said spaced intervals; a selector device controlling said decoding apparatus to determine the particular one of said plurality of receiver modes to be established by said decoding apparatus in any of said intervals; and means coupled to said selector and responsive to said second key signal for actuating said selector in accordance with said coding schedule to compensate for said mode variations of said television signal.

9. A subscription type of television receiver for utilizing a television signal having a timing characteristic varied selectively during spaced operating intervals from a first preselected value to second and third values selected in accordance with a prescribed coding schedule, and for further utilizing first and second key signals at least one of which is received concurrently with said television signal and respectively indicating said spaced intervals and said coding schedule, said receiver comprising: an image-reproducing device; circuit means for supplying said television signal to said reproducing device; decoding apparatus coupled to said circuit means for effecting during said spaced intervals variations in the operating mode of said receiver as between a second and third operating mode corresponding to said second and third values; means for applying said first key signal to said decoding apparatus to actuate said apparatus during said spaced intervals; a selector device controlling said decoding apparatus to determine the particular one of said second and third receiver modes to be established by said decoding apparatus in any of said intervals; and means coupled to said selector and responsive to said second key signal for actuating said selector in accordance with said coding schedule to compensate for said mode variations of said television signal.

10. A subscription type of television system comprising: a generator for developing a television signal representing a scanned subject and for transmitting said signal to a subscriber receiver; coding apparatus coupled to said generator for selectively varying the transmission of said signal between a plurality of different transmitting modes during spaced operating intervals; a control circuit for controlling said coding apparatus in accordance with a first coding schedule to determine a first group of spaced operating intervals in each of which a variation is effected in the mode of transmission; a selector device controlling said coding apparatus to determine a second group of spaced operating intervals in certain of which a mode variation is likewise effected and also to determine the particular one of said plurality of modes selected by said coding apparatus during said spaced operating intervals of both said groups; and means coupled to said selector device for actuating said device in accordance with a second coding schedule; said receiver comprising: an image-reproducing device; circuit means for supplying said television signal to said reproducing device; decoding apparatus coupled to said circuit means for effecting during said spaced intervals variations in the operating mode of said receiver as between a corresponding plurality of operating modes; a control circuit for controlling said decoding apparatus in accordance with said first coding schedule; a selector device controlling said decoding apparatus to determine the particular one of said plurality of receiver modes to be established by said decoding apparatus in said intervals of both said groups; and means coupled to said last-mentioned selector for actuating said selector in accordance with said second coding schedule to compensate for said mode variations of said television signal.

11. A subscription type of television system comprising: a video-signal generator for developing a video signal representing a scanned subject; a mixer amplifier coupled to said video-signal generator for producing a television signal; means coupled to said mixer for transmitting said television signal to a subscriber receiver; coding apparatus coupled to said video-signal generator for varying selectively the transmission of said television signal between a plurality of different transmitting modes during spaced operating intervals; a control circuit for controlling said coding apparatus in accordance with a first coding schedule to determine a first group of spaced operating intervals in each of which a variation is effected in the mode of transmission; a first key-signal generator coupled to said control circuit for producing a first key signal indicating said first group of spaced intervals for transmission to said subscriber receiver; a selector device controlling said coding apparatus to determine a second group of spaced operating intervals in certain of which a mode variation is likewise effected and also to determine the particular one of said plurality of modes selected by said coding apparatus during said spaced operating intervals of both said groups; a second control circuit coupled to said selector device for actuating said device in accordance with a second coding schedule; and a second key-signal generator coupled to said control circuit for producing a second key signal indicating said second group of spaced intervals for transmission to said subscriber receiver; said receiver comprising: an image-reproducing device; circuit means for supplying said television signal to said reproducing device; decoding apparatus coupled to said circuit means for effecting during said spaced intervals variations in the operating mode of said receiver as between a corresponding plurality of operating modes; means for applying said first key signal to said decoding apparatus to actuate said apparatus during said first group of spaced intervals; a selector device controlling said decoding apparatus to determine the particular one of said plurality of receiver modes to be established by said decoding apparatus in any of said intervals; and means coupled to said last-mentioned selector and responsive to said second key signal for actuating said last-mentioned selector in accordance with said second coding schedule to compensate for said mode variations of said television signal.

12. A subscription television system for translating a television signal during a program interval comprising: an encoding device for varying the operating mode of said system in accordance with and in response to the characteristic variations of an applied signal to encode said television signal; apparatus for developing a plurality of encoding signals each having characteristic variations occurring at intervals determined by a coding schedule; selecting means coupled to said apparatus for selectively applying said encoding signals to said encoding device; and control apparatus for actuating said selecting means at intervals long with respect to the aforesaid intervals determined by the coding schedules of said plurality of encoding signals but short with respect to said program interval in accordance with a selecting schedule to determine the selective application of said plurality of encoding signals to said encoding device, whereby a plurality of mode variations are effected between successive actuations of said selecting means during said program interval.

13. A subscription television transmitter comprising: a coding device for varying the operating mode of said transmitter to effect coding in accordance with and in response to the characteristic variations of an applied coding signal; apparatus for developing a plurality of coding signals each having characteristic variations occurring at intervals determined by a coding schedule; selecting means coupled to said apparatus for selectively applying said coding signals to said coding device; means for developing a key signal representing a selecting schedule; and a control circuit coupled to said key signal developing means and responsive to said key signal for actuating said selecting means at intervals long with respect to the aforesaid intervals determined by the coding schedules of said plurality of coding signals to determine the selective application of said plurality of coding signals to said coding device, whereby a plurality of mode variations are effected between successive actuations of said selecting means.

14. A subscription television receiver for utilizing a subscription television signal having its mode of transmission varied in accordance with a coding schedule comprising: a decoding device for effecting compensation in said receiver for the variations in mode of said television signal; apparatus for developing a plurality of decoding signals each having characteristic variations occurring at intervals determined by a coding schedule; selecting means coupled to said apparatus for selectively applying said decoding signals to said decoding device; means for developing a key signal representing a selecting schedule; and a control circuit coupled to said key signal developing means and responsive to said key signal for actuating said seelcting means at intervals long with respect to the aforesaid intervals determined by the coding schedules of said plurality of decoding signals to determine the selective application of said decoding signals to said decoding device, whereby a plurality of compensating mode variations are effected between successive actuations of said selecting means.

15. An encoding-signal source for controlling an encoding device to effect mode changes in a subscription television system during a program interval in accordance with and in response to the characteristic variations of an applied signal comprising: apparatus for developing a plurality of encoding signals each having characteristic variations occurring at intervals determined by a coding schedule; selecting means coupled to said apparatus for selectively applying said encoding signals to said encoding device; and means for actuating said selecting means at intervals long with respect to the aforesaid intervals determined by the coding schedules of said plurality of encoding signals but short with respect to said program interval in accordance with a selecting schedule to determine the selective application of said plurality of encoding signals to said encoding device, whereby a plurality of mode variations are effected between successive actuations of said selecting means during said program interval.

16. A subscription television system for translating a subscription television signal comprising: an encoding device for establishing said television system in any one of a plurality of operating modes during spaced time intervals effectively to encode said television signal; a control mechanism for controlling said encoding device to determine a first group of spaced time intervals in each of which a mode variation is effected; selector means controlling said encoding device to determine a second group of spaced operating intervals in certain of which a mode variation is likewise effected and also to determine the particular one of said plurality of modes selected by said device during both of said groups of spaced time intervals; and means coupled to said selector means for effecting actuation thereof in accordance with a coding schedule.

17. In a subscription television system for translating a subscription television signal: an encoding device having at least three distinct operating conditions each of which establishes a different operating mode in said system; actuating apparatus coupled to said encoding device and responsive to an applied signal for effecting actuation of said device between its aforesaid operating conditions; means for developing a control signal having a characteristic which varies between a number of predetermined values less than the number of operating conditions of said encoding device and at spaced time intervals determined by a predetermined code schedule; and means for applying said control signal to said actuating apparatus to effect actuation of said encoding device as between its aforesaid operating conditions in a manner determined at least in part by said characteristic variations of said control signal to encode said television signal.

18. In a subscription television system for translating a subscription television signal: an encoding device having at least three distinct operating conditions each of which establishes a different operating mode in said system; actuating apparatus coupled to said encoding device and responsive to an applied signal for effecting actuation of said device between its aforesaid operating conditions; means for developing a control signal having an amplitude characteristic which varies between two predetermined values at spaced time intervals determined by a predetermined code schedule; and means for applying said control signal to said actuating apparatus to effect actuation of said encoding device as between its aforesaid operating conditions in a manner determined at least in part by said characteristic variations of said control signal to encode said television signal.

19. In a subscription system for translating a television signal: an encoding mechanism having at least three operating conditions each of which establishes a different operating mode in said system effectively to encode said television signal; a mode-determining network included within said encoding mechanism responsive to a reference signal condition for establishing one operating condition in said mechanism, responsive to a second signal condition for establishing a second operating condition in said mechanism, and responsive to a third signal condition for establishing a third operating condition in said mechanism; means for developing a control signal normally having a reference value and selectively having second and third predetermined values different from one another and different from said reference value; and means for applying said control signal to said mode-determining network to establish therein the aforesaid reference, second and third operating conditions as the value of said control signal corresponds to said reference, second and third values, respectively.

20. In a subscription system for translating a television signal having video components in recurring trace intervals and further having intervening synchronizing components: an encoding mechanism for controlling the time relation of said video and synchronizing components in accordance with its instantaneous operating condition and for varying said relation from time to time to effect encoding of said television signal; a mode-determining network included within said encoding mechanism responsive to a reference signal condition for establishing one operating condition in said mechanism, responsive to a second signal condition for establishing a second operating condition in said mechanism, and responsive to a third signal condition for establishing a third operating condition in said mechanism; means for developing a control signal normally having a reference value and selectively having second and third predetermined values different from one another and different from said reference value; and means for applying said control signal to said mode-determining network to establish therein the aforesaid reference, second and third operating conditions as the value of said control signal corresponds to said reference, second and third values, respectively.

References Cited in the file of this patent

UNITED STATES PATENTS

| | | |
|---|---|---|
| 2,401,405 | Bedford | June 4, 1946 |
| 2,487,682 | Wendt | Nov. 8, 1949 |
| 2,495,727 | Hutchinson | Jan. 31, 1950 |
| 2,510,046 | Ellett et al. | May 30, 1950 |
| 2,547,598 | Roschke | Apr. 3, 1951 |
| 2,563,448 | Aram et al. | Aug. 7, 1951 |
| 2,567,539 | Aram | Sept. 11, 1951 |